United States Patent
Yamada

(10) Patent No.: US 12,314,518 B2
(45) Date of Patent: May 27, 2025

(54) POSITION DETECTION DEVICE, INPUT DEVICE, AND POSITION DETECTION METHOD

(71) Applicant: Alps Alpine Co., Ltd., Tokyo (JP)

(72) Inventor: Tomoki Yamada, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 18/627,019

(22) Filed: Apr. 4, 2024

(65) Prior Publication Data
US 2024/0248567 A1 Jul. 25, 2024

Related U.S. Application Data

(63) Continuation of application No. PCT/JP2022/038375, filed on Oct. 14, 2022.

(30) Foreign Application Priority Data

Nov. 29, 2021 (JP) .................. 2021-192686

(51) Int. Cl.
*G06F 3/044* (2006.01)
(52) U.S. Cl.
CPC .................. *G06F 3/044* (2013.01)
(58) Field of Classification Search
CPC .............. G06F 3/044; G06F 3/0418
See application file for complete search history.

(56) References Cited

U.S. PATENT DOCUMENTS

| | | | |
|---|---|---|---|
| 9,933,895 B2* | 4/2018 | Ichihara | G06F 3/0446 |
| 2014/0240251 A1* | 8/2014 | Takano | G06F 3/04182 |
| | | | 345/173 |
| 2015/0277760 A1* | 10/2015 | Tagaya | G06F 3/04886 |
| | | | 715/711 |
| 2016/0202840 A1* | 7/2016 | Ichihara | G06F 3/0488 |
| | | | 345/174 |
| 2021/0011604 A1 | 1/2021 | Yoganandan et al. | |

FOREIGN PATENT DOCUMENTS

JP 2014-013434 1/2014

OTHER PUBLICATIONS

International Search Report from International Application No. PCT/JP2022/038375 dated Jan. 10, 2023 with translation.

* cited by examiner

*Primary Examiner* — Michael Pervan
(74) *Attorney, Agent, or Firm* — Beyer Law Group LLP

(57) ABSTRACT

The position detection device includes a detector that detects degrees of contact or degrees of proximity of an object to an operation surface at a plurality of detection positions on the operation surface and outputs a plurality of detection data representing the degrees at the plurality of detection positions, a coordinate calculator for calculating a spatial coordinate of the object in a spatial coordinate system having a first axis and a second axis included in a plane parallel to the operation surface and a third axis, based on the plurality of detection data detected by the detector, and a coordinate corrector that corrects a coordinate value of the first axis or a coordinate value of the second axis in the spatial coordinate based on a coordinate value of the third axis in the spatial coordinate calculated by the coordinate calculator.

10 Claims, 4 Drawing Sheets

Z = 20 mm

Z = 0 mm

POSITION DETECTION DEVICE, INPUT DEVICE, AND POSITION DETECTION METHOD

CLAIM OF PRIORITY

This application is a Continuation of International Application No. PCT/JP2022/038375 filed on Oct. 14, 2022, which claims benefit of Japanese Patent Application No. 2021-192686 filed on Nov. 29, 2021. The entire contents of each application noted above are hereby incorporated by reference.

BACKGROUND OF THE INVENTION

1. Field of the Invention

The present disclosure relates to a position detection device, an input device, and a position detection method.

2. Description of the Related Art

In general, an input device that includes a proximity sensor that detects a non-contact hovering operation on a touch surface and a touch sensor that detects a touch operation of contacting the touch surface, and that corrects an offset between a position of the hovering operation and a position of the touch operation on the touch surface has been used (refer to U.S. Patent Application Publication No. 2021/0011604, for example).

Here, such a general input device corrects an offset between a position of a hovering operation and a position of a touch operation which are detected by different sensors, and does not correct a two-dimensional coordinate of an object included in an operation surface in accordance with a degree of proximity to the operation surface of the object, such as a hand performing the hovering operation.

SUMMARY OF THE INVENTION

The present invention provides a position detection device, an input device, and a position detection method capable of correcting a two-dimensional coordinate of an object on an operation surface in accordance with a degree of contact or a degree of proximity.

A position detection device according to an embodiment of the present disclosure includes a detector that detects degrees of contact or degrees of proximity of an object to an operation surface at a plurality of detection positions on the operation surface and outputs a plurality of detection data representing the degrees at the plurality of detection positions, a coordinate calculator for calculating a spatial coordinate of the object in a spatial coordinate system having a first axis and a second axis included in a plane parallel to the operation surface and a third axis, based on the plurality of detection data detected by the detector, and a coordinate corrector that corrects a coordinate value of the first axis or a coordinate value of the second axis in the spatial coordinate based on a coordinate value of the third axis in the spatial coordinate calculated by the coordinate calculator.

DESCRIPTION OF THE PREFERRED EMBODIMENTS

Hereinafter, an embodiment applying a position detection device, an input device, and a position detection method according to the present disclosure will be described.

Embodiment

Figure 1:
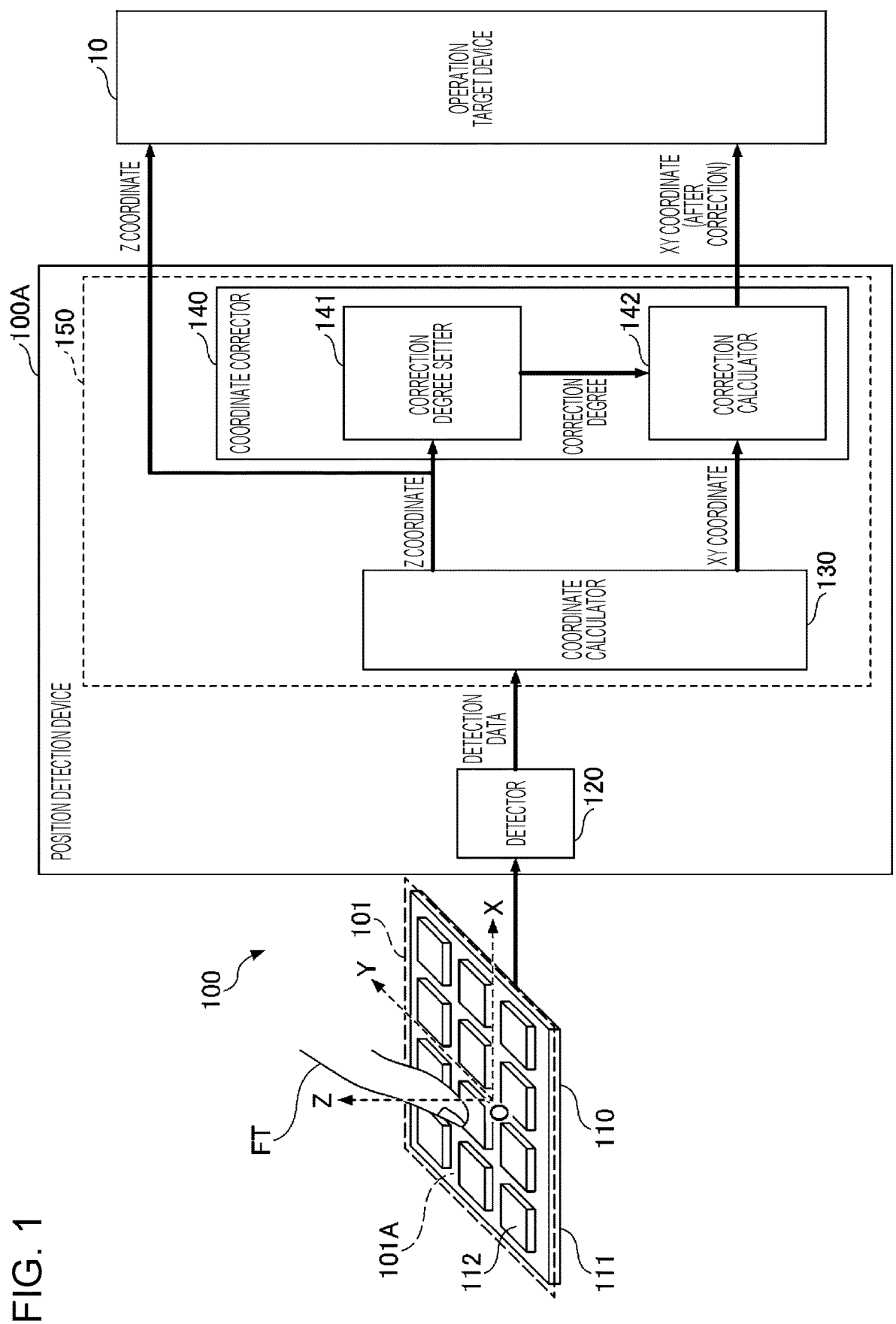
FIG. 1 is a diagram illustrating an example of a configuration of an input device 100 according to an embodiment.

FIG. 1 is a diagram illustrating an example of a configuration of an input device 100 according to an embodiment. In FIG. 1, an operation target device 10 which is a target of an input operation performed by an input device 100 is illustrated.

In the following, a description will be made while an XYZ coordinate system is defined. As an example, an origin O of the XYZ coordinate is a center of an operation surface 101A, and the XY coordinate of the origin O corresponds to a coordinate of a center of a sensor section 110. A direction parallel to an X axis (X direction), a direction parallel to a Y axis (Y direction), and a direction parallel to a Z axis (Z direction) are orthogonal to one another. The XYZ coordinate system is an example of a spatial coordinate system. The X-axis is an example of a first axis, the Y-axis is an example of a second axis, and the Z-axis is an example of a third axis. The X, Y, and Z coordinates in the XYZ coordinate system are examples of spatial coordinates. The X coordinate is an example of a coordinate value of the first axis, the Y coordinate is an example of a coordinate value of the second axis, and the Z coordinate is an example of a coordinate value of the third axis.

For convenience of explanation, a side in an −Z direction may be referred to as a lower side and a side in a +Z direction as an upper side, but this does not represent a universal vertical relationship. Also, a top surface side of a component is referred to as a front side and a lower surface side is referred to as a back side. Furthermore, a plan view means to view an XY plane. Moreover, lengths, thicknesses, and the like of each component may be exaggerated in the following to make a configuration easier to understand.

The input device 100 includes a cover 101, the sensor section 110, and a position detection device 100A. Furthermore, a position detection method of this embodiment is a method for detecting a position of an operation input performed by the position detection device 100A. In the following, a form in which a user of the input device 100 performs an input operation on the operation surface 101A using a fingertip FT will be described. The fingertip FT is an example of an object in contact with or approaches the operation surface 101A. However, the user may perform an input operation using a body part other than the fingertip FT.

The input device 100 detects a spatial coordinate of an input operation performed by the fingertip FT of the user, corrects X and Y coordinates (XY coordinate) in accordance with a Z coordinate, and outputs the corrected XY coordinate and the Z coordinate. The input device 100 may be one that remotely controls the operation target device 10, or one that is integrally disposed on the operation target device 10. Furthermore, the input device 100 may be portable or fixedly mounted on a wall or the like.

Here, a form in which the cover 101 and the sensor section 110 are transparent will be described assuming that a display panel (display device), such as a liquid crystal display panel or an organic EL (Electroluminescence) display panel, is disposed below the input device 100, but the cover 101 and the sensor section 110 may not be transparent when, for example, the display panel is not disposed. Buttons and the like of graphic user interfaces (GUIs) displayed on the display panel disposed behind the sensor section 110 are visible through the cover 101 and the sensor section 110.

<Structure of Cover 101>

The cover 101 is disposed on a front side of the sensor section 110 and is a member having a rectangular plate-shaped in a plan view as an example. The cover 101 is disposed as a top panel covering an upper surface of the input device 100. An upper surface of the cover 101 corresponds to the operation surface 101A. The operation surface 101A has a plurality of detection positions corresponding to a plurality of electrodes 112 of the sensor section 110. Furthermore, as described above, for example, an origin O of an XYZ coordinate is the center of the operation surface 101A, and an XY plane including the X axis and the Y axis corresponds to the operation surface 101A, but the origin O of the XYZ coordinate may not correspond to the center of the operation surface 101A. In this case, the XY plane including the X axis and the Y axis is a plane parallel to the operation surface 101A.

The user of the input device 100 may perform an input operation by touching the operation surface 101A of the cover 101 with the fingertip FT (touch (contact)), or by bringing the fingertip FT close to the operation surface 101A without touching (non-contact). The cover 101 is made of transparent glass or resin, for example.

In the following, an input operation of a touch on the operation surface 101A is referred to as a touch input, and an input operation of bringing the fingertip FT close to the operation surface 101A without contact is referred to as a hovering input. Furthermore, the term "proximity" and "close to" means that the fingertip FT approaches the operation surface 101A such that a change detectable by the position detection device 100A occurs in capacitance of the sensor section 110 when the fingertip FT approaches the operation surface 101A.

<Structure of Sensor Section 110>

The sensor section 110 has a substrate 111 and the plurality of electrodes 112 disposed on an upper surface of the substrate 111. The sensor section 110 is a capacitive type sensor disposed for detecting a touch input or a hovering input performed on the GUI buttons using a change in capacitance of the plurality of electrodes 112. The capacitance of the electrodes 112 is an example of a physical quantity representing a degree of contact or proximity of the fingertip FT.

The substrate 111 may be made of a transparent insulator, for example, a transparent substrate made of polyimide may be used. The plurality of electrodes 112 are arranged on an upper surface of the substrate 111. The substrate 111 is not limited to a transparent substrate made of polyimide, and may be made of other materials. Alternatively, the plurality of electrodes 112 may be arranged on a lower surface of the substrate 111.

The plurality of electrodes 112 are arranged in a matrix in the X and Y directions. In FIG. 1, 12 electrodes 112 arranged in three rows in the Y direction and four columns in the X direction are illustrated, but any number of electrodes 112 may be arranged as long as the plurality of electrodes 112 are arranged. One or more electrodes 112 may be arranged for one GUI button. Furthermore, the electrodes 112 may be a plurality of linear electrodes extending in the X and Y directions.

The plurality of electrodes 112 are independent of one another as an example, and are connected to the position detection device 100A via wiring, not illustrated, which is routed among the electrodes 112 in a plan view. The plurality of electrodes 112 are composed of transparent electrodes made of Indium Tin Oxide (ITO), for example. Note that, when the display panel is not disposed on the back side of the sensor section 110, the plurality of electrodes 112 may be a metal plate or the like.

A detectable range of the electrodes 112 is, for example, within approximately 30 mm to approximately 50 mm from the operation surface 101A. The electrodes 112 may detect the proximity of the fingertip FT within approximately 30 mm to approximately 50 mm from the operation surface 101A. Furthermore, the sensor section 110 may detect the fingertip FT being touching the operation surface 101A. Capacitance of each of the electrodes 112 of the sensor section 110 is detected by a detector 120 of the position detection device 100A. The capacitance of each of the electrodes 112 varies depending on a touch input or a hovering input.

<Structure of Position Detection Device 100A>

The position detection device 100A has the detector 120, a coordinate calculator 130, and a coordinate corrector 140. The coordinate corrector 140 has a correction degree setter 141 and a correction calculator 142. Here, although a form in which the detector 120 is composed of an integrated circuit (IC) and the coordinate calculator 130 and the coordinate corrector 140 are configured by a microcomputer 150 will be described as an example, the configuration is not limited to this configuration. The microcomputer 150 is realized by a computer including a central processing unit (CPU), a random access memory (RAM), a read only memory (ROM), an input/output interface, and an internal bus. The coordinate calculator 130, the coordinate corrector 140, the correction degree setter 141, and the correction calculator 142 are functions of programs executed by the microcomputer 150 illustrated as functional blocks.

The detector 120 detects capacitance of the plurality of electrodes 112 of the sensor section 110 and outputs a plurality of detection data representing the capacitance at a plurality of detection positions on the operation surface 101A. The detector 120 digitally converts the capacitance (analog values) of the plurality of electrodes 112 supplied from the sensor section 110 and outputs detection data representing the capacitance of the digital values to the coordinate calculator 130. Although detailed description is omitted here, the detector 120 may have a function as a selection section that applies a voltage for selection, in the X direction and the Y direction in time division, of the 12 electrodes 112 arranged in the three rows by the four columns.

The coordinate calculator 130 calculates an XY coordinate of a touch input or a hovering input and calculates a Z coordinate of the touch input or the hovering input based on the detection data supplied from the detector 120. Various methods may be used to calculate the XY coordinate, such as a method for calculating a center of gravity coordinate or a method for calculating a position of a peak with a greatest capacitance. Here, as an example, a mode in which a method for, of all the detection data obtained from the capacitance of all the electrodes 112, obtaining as an XY coordinate a center of gravity of positions of a number of the electrodes 112 (for example, a center of gravity of positions of 9 of the 12 electrodes 112) corresponding to a number of the detection data (for example, 9 of the 12 detection data) with larger amounts of change in capacitance is used will be described. As a position of each of the electrodes 112, as an example, it is sufficient to use a position of a center of an XY coordinate of the electrode 112.

Furthermore, although various methods may be employed for calculating a Z coordinate, a mode in which the coordinate calculator 130 calculates a distance corresponding to capacitance represented by detection data having a largest amount of change in the capacitance among the detection data obtained from the capacitance of all the electrodes 112 as a Z coordinate of the fingertip FT with respect to the operation surface 101A will be described herein as an example. The coordinate calculator 130 outputs data representing the calculated XY coordinate and the calculated Z coordinate to the coordinate corrector 140. Furthermore, the coordinate calculator 130 outputs data representing the Z coordinate to the operation target device 10. Calculating the Z coordinate in this way corresponds to calculating the Z coordinate based on a plurality of detection data supplied from the detector 120.

The coordinate corrector 140 has the correction degree setter 141 and the correction calculator 142. The coordinate corrector 140 corrects the XY coordinate based on the Z coordinate calculated by the coordinate calculator 130.

The correction degree setter 141 determines a degree of correction for correcting the XY coordinate based on the Z coordinate supplied from the coordinate calculator 130, and outputs the determined correction degree to the correction calculator 142. A specific method for determining a correction degree will be described hereinafter.

The correction calculator 142 corrects the XY coordinate supplied from the coordinate calculator 130 using the correction degree supplied from the correction degree setter 141. In this way, the correction calculator 142 calculates a corrected XY coordinate. The correction calculator 142 outputs the corrected XY coordinate to the operation target device 10. A specific calculation method of the corrected XY coordinate will be described later.

<Shift Between Center of Gravity Coordinate and Fingertip FT>

Figure 2:
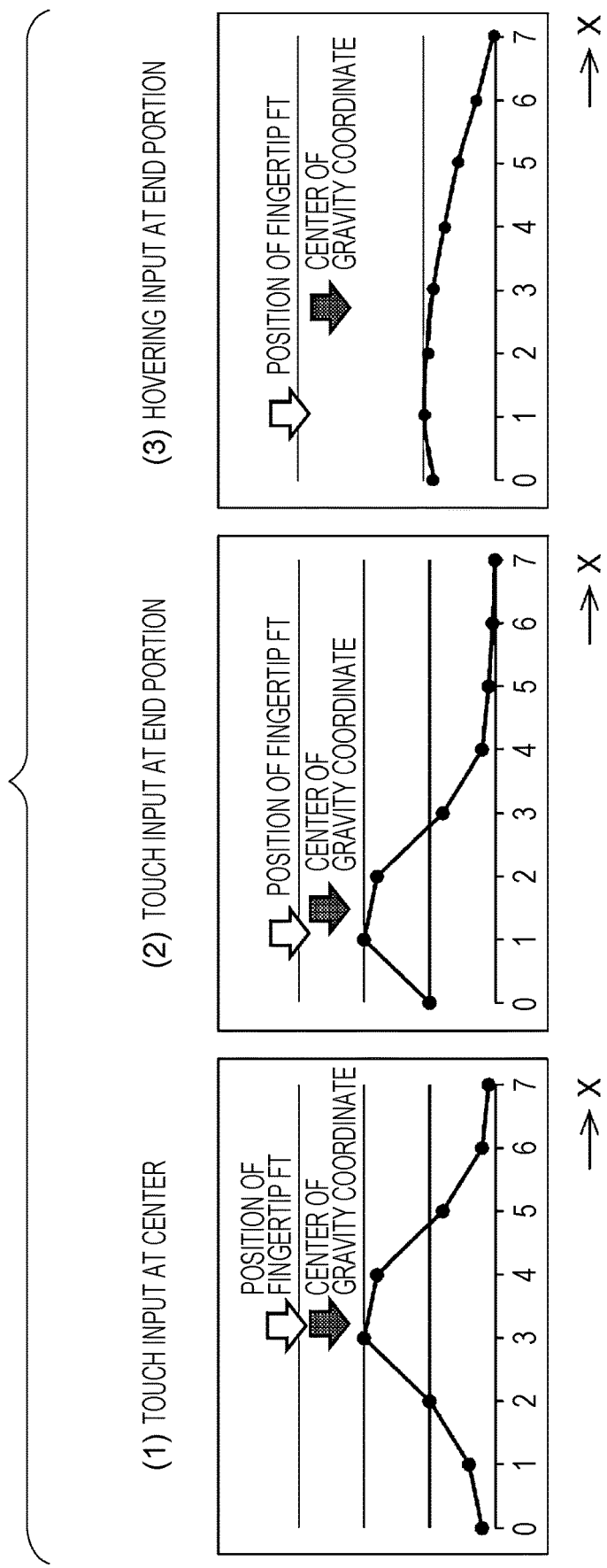
FIG. 2 includes diagrams illustrating a shift between a center of gravity coordinate and a fingertip FT.

FIG. 2 includes diagrams illustrating a shift between a position of the center of gravity coordinate and the fingertip FT. Here, a shift between the center of gravity coordinate and a position of the fingertip FT, which may occur when the input device 100 does not correct an XY coordinate, will be described. The center of gravity coordinate is an XY coordinate of the fingertip FT calculated by the coordinate calculator 130 as a position of the center of gravity.

In FIG. 2, axes of abscissae represent the X direction and the axes of ordinates represent capacitance. Since a shift between the position of the center of gravity coordinate and the position of the fingertip FT may occur in the X direction and the Y direction in the same manner, a shift between a position of the X coordinate of the center of gravity coordinate and a position of the X coordinate of the fingertip FT in the X direction will be described herein for the sake of simplicity. Furthermore, a description will be made assuming that eight electrodes 112 are arranged in the X direction and eight capacitance values are obtained. Positions of the eight electrodes 112 are positions 0 to 7 shown in the X direction.

In FIG. 2, distribution of capacitance in the X direction, positions of the fingertip FT, and center of gravity coordinates (X coordinates) obtained when a touch input or a hovering input is performed in three patterns (1), (2), and (3) are illustrated. The positions of the fingertip FT are indicated by white arrows, and the center of gravity coordinates are indicated by black arrows.

In the pattern (1), distribution of capacitance when the fingertip FT touches the operation surface 101A at a position near a center of the X direction is illustrated. That is, a touch input is performed near the center of the X direction. In this case, the distribution of capacitance changes relatively steeply with the position of the fingertip FT as an approximate center, and relatively symmetrical distribution in the +X directions is obtained with the position of the fingertip FT as the approximate center. This is because the fingertip FT touches the operation surface 101A, and therefore, capacitance becomes larger at the position of the fingertip FT, and the fingertip FT touches the center of the operation surface 101A, and therefore, the capacitance becomes largest near the center in the X direction and decreases as positions farther from the fingertip FT.

When the distribution of capacitance in the pattern (1) is obtained, for example, the center of gravity coordinate is calculated based on the capacitance of the zeroth to seventh electrodes 112, and therefore, the center of gravity coordinate is substantially equal to the position of fingertip FT, and a shift is small. Note that the same applies when the number of electrodes 112 used for calculating the center of gravity coordinate is reduced and the center of gravity coordinate is calculated using the first to sixth electrodes 112 or the second to fifth electrodes 112.

In the pattern (2), distribution of capacitance when the fingertip FT touches the operation surface 101A on a side in the −X direction is illustrated. That is, a touch input is performed on the side in the −X direction. In this case, the distribution of capacitance changes relatively steeply with the position of the fingertip FT as an approximate center, but since the position of the fingertip FT is on a side in the −X direction, the distribution of capacitance becomes asymmetric in the +X direction relative to the position of the fingertip FT. This is because, although large capacitance is obtained at the position of the fingertip FT since the fingertip FT touches the operation surface 101A, the position of the fingertip FT is offset in the −X direction relative to the center in the X direction.

When the distribution of capacitance in the pattern (2) is obtained, for example, a center of gravity coordinate is calculated based on the capacitance of the zeroth to seventh electrodes 112, and therefore, the center of gravity coordinate is shifted to a center side (+X direction side) in the X direction relative to the position of the fingertip FT. This is because, when capacitances of two of the electrodes 112 which are adjacent to the first electrode 112 positioned directly below the position of the fingertip FT are compared with each other, the capacitance of the second electrode 112 on the center side in the X direction is larger than the capacitance of the zeroth electrode 112 on an outer side in the X direction (−X direction side), a difference is large, and the number of electrodes 112 in positions in the +X direction relative to the first electrode 112 positioned directly below the position of the fingertip FT is larger.

In the pattern (3), distribution of capacitance when the fingertip FT approaches the operation surface 101A on a side in the −X direction is illustrated. That is, a hovering input is performed on the side in the −X direction. A position in the X direction of the fingertip FT performing the hovering input in the pattern (3) is equal to the position in the X direction of the fingertip FT performing the touch input in the pattern (2).

In the case of the hovering input, a Z position of the fingertip FT is farther away from the operation surface 101A than in the case of the touch input, and a distance from the operation surface 101A is longer, and therefore, capacitance of the first electrode 112 directly below the fingertip FT is smaller than that in the case of the touch input. Therefore, distribution of capacitance centered on the position of the fingertip FT becomes gentle, and since the position of the fingertip FT is on a side in the −X direction, the distribution of capacitance becomes asymmetric in the +X direction relative to the position of the fingertip FT.

When the distribution of capacitance in the pattern (3) is obtained, for example, the center of gravity coordinate is calculated based on the capacitance of the zeroth to seventh electrodes 112, and therefore, the center of gravity coordinate is shifted to a center side (+X direction side) in the X direction relative to the position of the fingertip FT. Since the distribution of capacitance is gentle, the center of gravity coordinate is significantly shifted toward the center than that in the case of pattern (2).

Since the hovering input is an input operation performed without touching the operation surface 101A, the longer the distance in the Z direction between the operation surface 101A and the fingertip FT is, the smaller the capacitance of the zeroth to seventh electrodes 112 is and the gentler the distribution of the capacitance is. As the distribution of capacitance becomes gentler, the capacitance of the zeroth to seventh electrodes 112 becomes the same, so that the center of gravity coordinate is shifted so as to be pulled toward the center.

As can be seen from comparison between the pattern (2) and the pattern (3), when an operation is performed with the fingertip FT on the operation surface 101A, a difference in a center of gravity coordinate with respect to a position of the fingertip FT depends on a distance in the Z direction between the operation surface 101A and the fingertip FT, and as the distance in the Z direction between the operation surface 101A and the fingertip FT becomes greater, the center of gravity coordinate is shifted to a more center side.

Furthermore, as can be seen from comparison between the pattern (1) and the pattern (2), when a touch input is performed, a degree of the shift of the center of gravity coordinate with respect to the position of the fingertip FT varies depending on the position of the fingertip FT in the X direction, and the shift between the position of the fingertip FT and the center of gravity coordinate becomes larger as the position of the fingertip FT becomes closer to the edge of the X direction. Next, a shift of an XY coordinate calculated as the center of gravity will be described with reference to FIGS. 3A to 3C.

<Shift of XY Coordinate>

Figure 3A:
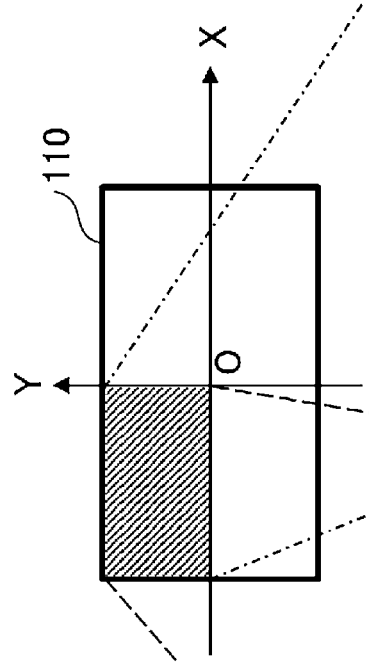
FIGS. 3A to 3C are diagrams illustrating a shift of XY coordinates as center of gravity coordinates calculated by a coordinate calculator 130.
Figure 3C:
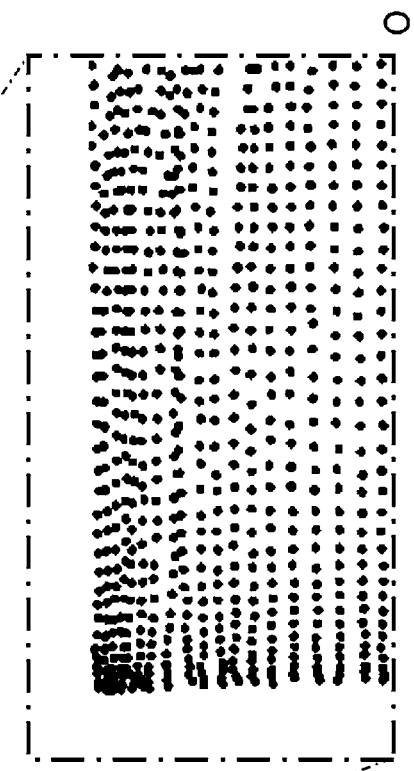
Figure 3B:
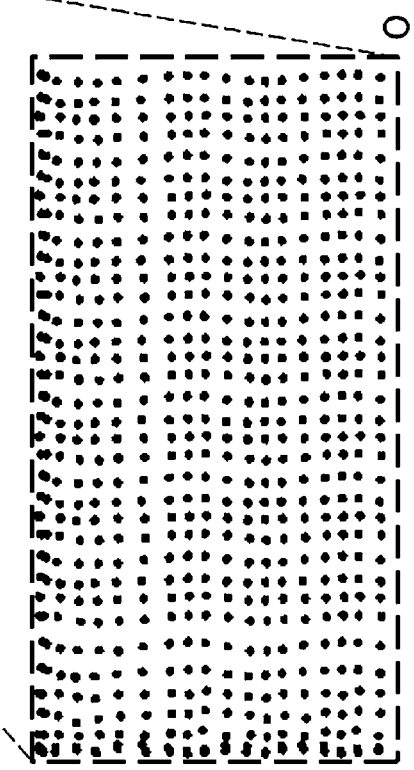

FIGS. 3A to 3C are diagrams illustrating a shift of an XY coordinate as the center of gravity coordinate calculated by the coordinate calculator 130. In FIG. 3A, a state in which the sensor section 110 is equally divided into four by the X and Y axes is illustrated. Here, an origin O of the XYZ coordinate is a point directly above a center of the sensor section 110 in the operation surfaces 101A. Therefore, in FIG. 3A, the origin O is illustrated at the center of the sensor section 110. A Z coordinate of the operation surface 101A corresponds to "Z=0 mm". Therefore, a position in the Z direction of the fingertip FT when performing a touch input is represented as "Z=0 mm".

In FIG. 3B, distribution of center of gravity coordinates obtained when a touch input is performed at a position of Z=0 mm while the position of the fingertip FT is shifted at regular intervals in the X and Y directions in an entire region within a second quadrant of the sensor section 110 illustrated in FIG. 3A is illustrated. In FIG. 3B, individual points indicated by dots represent XY coordinates as the center of gravity coordinates calculated by the coordinate calculator 130. That is, in FIG. 3B, distribution of the center of gravity coordinates obtained when a touch input is performed at a position of Z=0 mm while a position of the fingertip FT is shifted at regular intervals from an edge in the −X direction to an edge in the +X direction in the X direction and from an edge in the −Y direction to an edge in the +Y direction in the Y direction within the second quadrant of the sensor section 110 illustrated in FIG. 3A is illustrated.

In FIG. 3C, distribution of center of gravity coordinates obtained when a hovering input is performed at a position of Z=20 mm while the position of the fingertip FT is shifted at regular intervals in the X and Y directions in the entire region of the second quadrant of the sensor section 110 illustrated in FIG. 3A is illustrated. In FIG. 3C, individual points indicated by dots represent XY coordinates as the center of gravity coordinates calculated by the coordinate calculator 130. That is, in FIG. 3C, distribution of the center of gravity coordinates obtained when a hovering input is performed at a position of Z=20 mm while a position of the fingertip FT is shifted at regular intervals from an edge in the −X direction to an edge in the +X direction in the X direction and from an edge in the −Y direction to an edge in the +Y direction in the Y direction within the second quadrant of the sensor section 110 illustrated in FIG. 3A is illustrated.

As illustrated in FIG. 3B, since the center of gravity coordinates obtained when a touch input is performed at the position of Z=0 mm are distributed in the entire region of the second quadrant, it is considered that the center of gravity coordinates appropriately represent the positions of the fingertip FT.

On the other hand, as illustrated in FIG. 3C, the center of gravity coordinates obtained when a hovering input is performed at a position of Z=20 mm are entirely shifted to the origin O side in the second quadrant, and it can be seen that the center of gravity coordinates are distorted. Although only the center of gravity coordinates in the second quadrant are illustrated here, it is considered that center of gravity coordinates of first, third, and fourth quadrants are shifted to the origin O side as well.

Furthermore, as illustrated in FIG. 3C, the center of gravity coordinates obtained when a hovering input is performed at the position of Z=20 mm are relatively evenly spaced between the dots on the side near the origin O, but the interval between the dots becomes shorter and denser as the center of gravity coordinates are farther away from the origin O. This indicates that as the center of gravity coordinates are farther away from the origin O, shifts in the center of gravity coordinates relative to the positions of the fingertip FT become greater. The origin O is the center, in the plan view, of the sensor section 110 and the operation surface 101A.

Based on a difference in the distributions of the center of gravity coordinates of FIGS. 3B and 3C as described above and a difference between the patterns (2) and (3) described with reference to FIG. 2, it has been found that the XY coordinates as the center of gravity coordinates calculated by the coordinate calculator 130 are shifted to the origin O side depending on the Z coordinates of the fingertip FT. In addition, in the case of performing a hovering input, the distribution of the capacitance, such as the pattern (3), becomes a gentle (nearly flat) distribution as a distance in the Z direction between the operation surface 101A and the fingertip FT increases, and it is found that the center of gravity coordinates shift to the center side as a distance in the Z direction between the operation surface 101A and the fingertip FT increases.

Therefore, the input device 100 corrects the XY coordinates as the center of gravity coordinates calculated by the coordinate calculator 130 to be shifted to an end side of the operation surface 101A in accordance with the Z coordinate of the fingertip FT so as to move the corrected XY coordinates closer to the position of the fingertip FT. In addition, the input device 100 moves the corrected XY coordinates closer to the positions of the fingertip FT in accordance with the Z coordinate of the fingertip FT by increasing a degree of correction to correct the center of gravity coordinates, as a value of the Z coordinate of the fingertip FT increases (a distance between the operation surface 101A and the fingertip FT increases).

Furthermore, at this time, the input device 100 moves the corrected XY coordinates closer to the positions of the fingertip FT in accordance with the Z coordinate of the fingertip FT by increasing the degrees of correction of the center of gravity coordinates as the coordinate is positioned farther from the center coordinate of the operation surface 101A.

Specifically, the correction degree setter 141 and the correction calculator 142 of the coordinate corrector 140 perform the following processing.

The correction degree setter 141 sets a correction degree C. when correcting an XY coordinate calculated by the coordinate calculator 130 based on a Z coordinate calculated by the coordinate calculator 130. The correction degree setter 141 sets the correction degree C. larger as the calculated Z coordinate is larger, and sets the correction degree C. smaller as the calculated Z coordinate is smaller.

In addition, the correction degree setter 141 sets a larger correction degree C. as the XY coordinate calculated by the coordinate calculator 130 is farther away from the center coordinate of the operation surface 101A, and sets a smaller correction degree C. as the XY coordinate calculated by the coordinate calculator 130 is closer to the center coordinate of the operation surface 101A.

The correction calculator 142 corrects an XY coordinate (X, Y) in an XYZ coordinate (X, Y, Z) calculated by the coordinate calculator 130 in accordance with Equations (1) and (2) below as an example to obtain a corrected XY coordinate $(X_c, Y_c)$:

$$X_c = X_o + (X - X_o) \times C_o \times Z \quad (1)$$

$$Y_c = Y_o + (Y - Y_o) \times C_o \times Z \quad (2)$$

Note that an appropriate number is assigned to Co. When the corrected XY coordinate $(X_c, Y_c)$ is to be obtained, the Z coordinate (Z) in the XYZ coordinate (X, Y, Z) calculated by the coordinate calculator 130 is used. Note that a center coordinate of the operation surface 101A is $(X_o, Y_o)$. Here, since the center of the operation surface 101A matches the origin O, the center coordinate $(X_o, Y_o)=(0, 0)$.

Note that in this case, since the correction degree C. is a difference between the corrected coordinate and the coordinate before the correction, the correction degree C. is represented as Equation (3) below.

$$\begin{aligned}C = |X_{diff}| &= |X_c - X| \\ &= |X_o + (X - X_o) \times C_o \times Z - X| \\ &= |X \times (C_o \times Z - 1) + X_o \times (1 - C_o \times Z)| \\ &= |(X - X_o)| \times |(C_o \times Z - 1)|\end{aligned} \quad (3)$$

<Flowchart>

Figure 4:
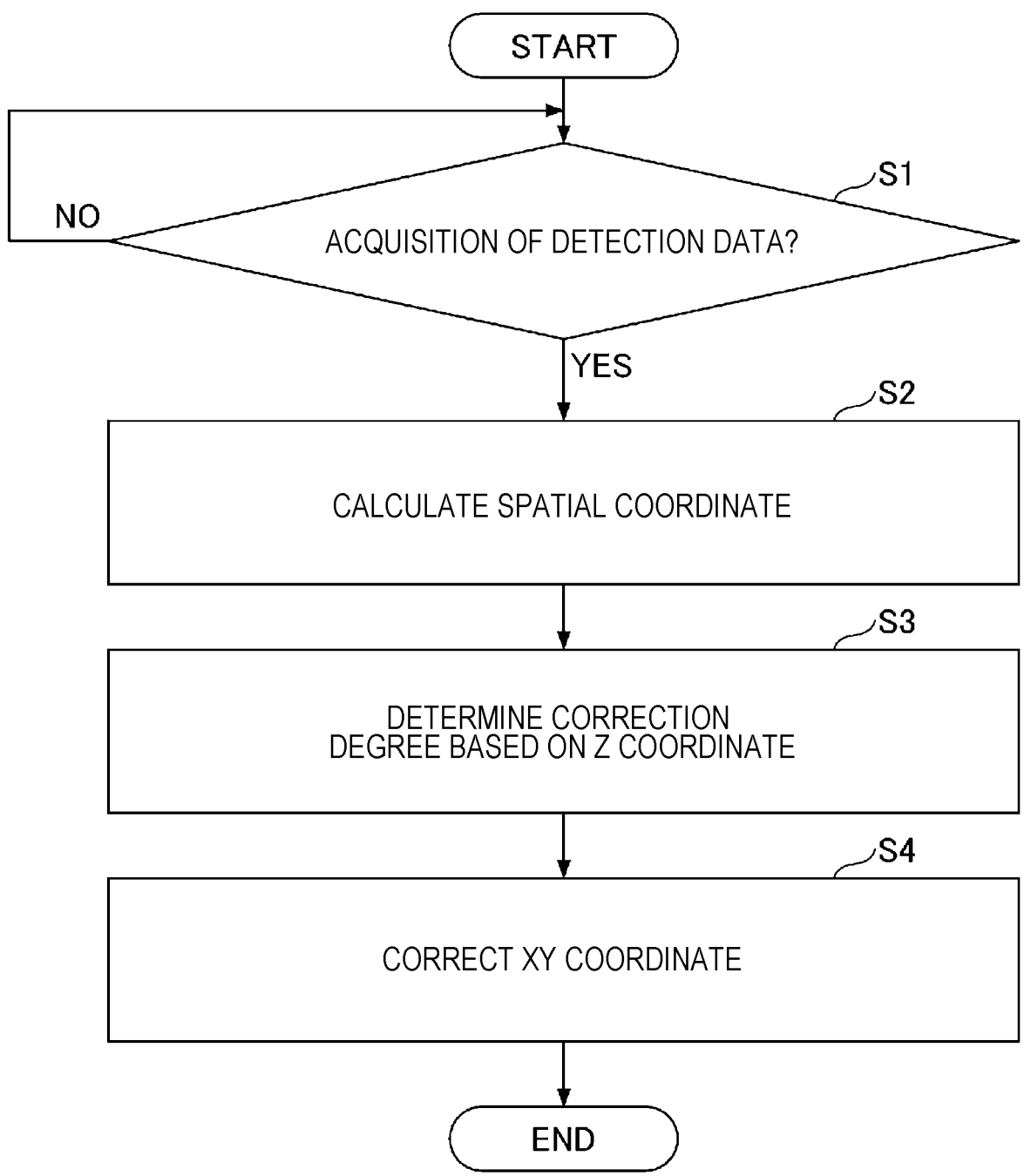
FIG. 4 is a flowchart of a process executed by the coordinate calculator 130 and a coordinate corrector 140.

FIG. 4 is a flowchart of a process executed by the coordinate calculator 130 and the coordinate corrector 140. The flowchart in FIG. 4 is realized when the microcomputer 150 executes a program stored in the memory.

When a process starts, the coordinate calculator 130 determines whether detection data has been obtained from the detector 120 (step S1). When the coordinate calculator 130 determines that the detection data has not been obtained (S1: NO), the process in step S1 is performed again.

When the coordinate calculator 130 determines that the detection data has been obtained from the detector 120 (S1: YES), a spatial coordinate is calculated based on capacitance represented by the detection data (step S2). The coordinate calculator 130 calculates an XY coordinate in the spatial coordinate as a center of gravity coordinate as an example, and calculates a distance corresponding to the capacitance represented by detection data in which a change in capacitance is largest as a Z coordinate of the fingertip FT.

Then, the correction degree setter 141 sets the correction degree C. when the XY coordinate is corrected based on the Z coordinate calculated by the coordinate calculator 130 (step S3).

Thereafter, the correction calculator 142 corrects the XY coordinate (X, Y) calculated by the coordinate calculator 130 in accordance with Equations (1) and (2) to obtain a corrected XY coordinate $(X_c, Y_c)$ (step S4). This completes the series of processes. When the process in step S4 is terminated, the flow returns to the start.

Note that the correction calculator 142 may calculate the corrected X coordinate $X_c$ or the corrected Y coordinate $Y_c$ by correcting one of the X and Y coordinates (X, Y) calculated by the coordinate calculator 130 based on Equation (1) or (2). This method is employed when, for example, only the X coordinate is required to be corrected or only the Y coordinate is required to be corrected depending on characteristics of the sensor section 110.

Effects

As described above, the X coordinate or the Y coordinate in the spatial coordinate is corrected based on the Z coordinate in the spatial coordinate calculated by the coordinate calculator 130. Therefore, distortion of the spatial coordinate calculated by the coordinate calculator 130 may be corrected, and the corrected X coordinate or the corrected Y coordinate representing the position of the fingertip FT may be calculated.

Therefore, the position detection device 100A, the input device 100, and the position detection method that may correct an XY coordinate of the fingertip FT in the operation surface 101A in accordance with a degree of contact or proximity may be provided. Furthermore, since the X coordinate or the Y coordinate is corrected based on the Z coordinate calculated by the coordinate calculator 130, a sudden change in the corrected X coordinate or the corrected Y coordinate may be suppressed, and the X coordinate or the Y coordinate may be corrected so that the X coordinate or the Y coordinate smoothly gradually changes in accordance with the Z coordinate.

Moreover, the degree of contact or proximity is represented by the capacitance of the fingertip FT in the detection position, and the coordinate calculator 130 calculates a coordinate value in the Z axis based on a plurality of detection data represented by the capacitance. Since the capacitance between the sensor section 110 and the fingertip FT varies according to a distance in the Z direction between the operation surface 101A and the fingertip FT, the Z coordinate at a time of contact or proximity may be easily and reliably determined.

Furthermore, the coordinate corrector 140 increases the correction degree C. to correct the X coordinate or the Y coordinate as the Z coordinate calculated by the coordinate calculator 130 becomes larger. Since distortion of a spatial coordinate calculated by the coordinate calculator 130 increases as a distance in the Z direction between the operation surface 101A and the fingertip FT increases, a larger correction may be made when the distortion is larger, and the distortion of the XY coordinate in the spatial coordinate calculated by the coordinate calculator 130 may be corrected in accordance with the Z coordinate of the fingertip FT.

In addition, since the coordinate calculator 130 calculates the X coordinate and the Y coordinate by performing the center of gravity calculation on the plurality of detection data output from the detector 120, the center of gravity coordinate in an XY plane of the fingertip FT may be calculated as an XY coordinate while influence of noise, etc. is suppressed.

Furthermore, the coordinate corrector 140 corrects the X coordinate or the Y coordinate to shift to the end side of the operation surface 101A. Since an XY coordinate as a center of gravity coordinate calculated by the coordinate calculator 130 is distorted to the center side, the distortion of the XY coordinate calculated by the coordinate calculator 130 may be corrected by correcting the XY coordinate in the direction shifted to the end side of the operation surface 101A.

In addition, the coordinate corrector 140 increases the correction degree C. to correct the X coordinate as the X coordinate is farther away from a center coordinate corresponding to the center of the operation surface 101A. Since an X coordinate as a center of gravity calculated by the coordinate calculator 130 is greatly distorted toward the center as the edge of the operation surface 101A is, by increasing the correction degree C. as it is farther from the center coordinate, the distortion of the X coordinate calculated by the coordinate calculator 130 may be appropriately corrected in accordance with a distance from the center coordinate.

Furthermore, the coordinate corrector 140 increases the correction degree C. to correct a coordinate value in the Y axis as the coordinate value in the Y axis is farther from the center coordinate corresponding to the center of the operation surface 101A. Since the Y coordinate as the center of gravity calculated by the coordinate calculator 130 is greatly distorted toward the center as the edge of the operation surface 101A is, by increasing the correction degree C. as it is farther from the center coordinate, the distortion of the Y coordinate calculated by the coordinate calculator 130 may be appropriately corrected in accordance with the distance from the center coordinate.

Modification

In the above, the form in which an XY coordinate calculated as a center of gravity coordinate is corrected using the correction degree C. set based on a Z coordinate in a spatial coordinate calculated by the coordinate calculator 130 has been described.

However, the correction form is not limited to the form in which an XY coordinate is corrected by using the correction degree C. in this way, and for example, a threshold value may be set for a Z coordinate in a spatial coordinate calculated by the coordinate calculator 130 and the correction according to Equations (1) and (2) may be performed when the Z coordinate is equal to or greater than the threshold value. For example, in the case where a touch input is performed (in the case of Z=0 mm), or in the case where a position of the fingertip FT is extremely close to the operation surface 101 A even in a hovering input (for example, the Z coordinate is less than 5 mm), when distortion of an XY coordinate as a center of gravity coordinate calculated by the coordinate calculator 130 is small enough that it is not a problem and when a Z coordinate is equal to or greater than the threshold value, correction is sufficiently performed in accordance with Equations (1) and (2). In this case, when the Z coordinate is less than the threshold value, it is sufficient to output an XY coordinate as a center of gravity coordinate calculated by the coordinate calculator 130 to the operation target device 10 as it is.

Even when a threshold value is provided for the Z coordinate in this way, the position detection device 100A, the input device 100, and the position detection method that may correct an XY coordinate of the fingertip FT on the operation surface 101A according to a degree of contact or proximity may be provided.

Furthermore, in the above, the coordinate calculator 130 calculates a Z coordinate, and the coordinate corrector 140 sets the correction degree C. according to the Z coordinate to correct an XY coordinate. However, since the Z coordinate is a value inversely proportional to capacitance of detection data, the XY coordinate may be corrected according to the capacitance represented by the detection data without obtaining the Z coordinate. In this case, the larger the capacitance is, the smaller the degree of correction to correct an X coordinate or a Y coordinate is. Since a Z coordinate is a value inversely proportional to capacitance of detection data, an XY coordinate will be corrected based on the Z coordinate even when the Z coordinate is not obtained.

As described above, a position detection device, an input device, and a position detection method of an exemplary embodiment of the present disclosure have been described, but the present invention is not limited to the specifically disclosed embodiment, and various modifications and changes may be made without departing from the scope of the claims.

This international application claims priority based on Japanese Patent Application 2021-192686 filed on Nov. 29, 2021, and the entire contents of which are hereby incorporated by reference into this international application.

What is claimed is:

1. A position detection device for detecting a position of an object approaching or in contact with an operation surface, the position detection device comprising:
   a detector configured to detect a degree of contact or proximity of the object at a plurality of detection positions of the operation surface, and output a plurality of detection values representing the degree at the plurality of detection positions;
   a coordinate calculator configured to calculate spatial coordinates of the object in a spatial coordinate system having a first axis and a second axis parallel to the operation surface and a third axis perpendicular to the operation surface, based on the plurality of detection values output from the detector, the calculated spatial coordinates having a first coordinate, a second coordinate, and a third coordinate corresponding to the first axis, the second axis, and the third axis, respectively; and a coordinate corrector configured to correct a value of the first coordinate or a value of the second coordinate based on a value of the third coordinate.

2. The position detection device according to claim 1, wherein the degree of contact or proximity is represented by capacitance of the object at the plurality of detection positions, and the coordinate calculator calculates the third coordinate based on the plurality of detection values each represented by the capacitance.

3. The position detection device according to claim 1, wherein the greater the value of the third coordinate calculated by the coordinate calculator becomes, the greater a correction degree for correcting the value of the first or the second coordinate becomes.

4. The position detection device according to claim 1, wherein the coordinate calculator is configured to calculate the first coordinate and the second coordinate by performing a center of gravity calculation on the plurality of detection values output from the detector.

5. The position detection device according to claim 1, wherein the coordinate corrector is configured to correct the value of the first or the second coordinate so as to shift the first or the second coordinate toward an end side of the operation surface.

6. The position detection device according to claim 1, wherein the coordinate corrector is configured to increase a correction degree for correcting the value of the first coordinate as the first coordinate is farther away from a center coordinate corresponding to a center of the operation surface.

7. The position detection device according to claim 1, wherein the coordinate corrector is configured to increase a correction degree for correcting the value of the second coordinate as the second coordinate is farther away from a center coordinate corresponding to the center of the operation surface.

8. The position detection device according to claim 1, wherein the first axis, the second axis, and the third axis are orthogonal to one another.

9. An input device, comprising:
a sensor disposed behind an operation surface which an object approaches or the object is in contact with, the sensor being configured to output a plurality of physical values representing a degree of contact or proximity of the object at a plurality of detection positions of the operation surface;

a detector configured to detect the degree of contact or proximity at the plurality of positions based on the plurality of physical values, and output a plurality of detection values representing the degree at the plurality of detection positions;

a coordinate calculator configured to calculate spatial coordinates of the object in a spatial coordinate system having a first axis and a second axis parallel to the operation surface and a third axis perpendicular to the operation surface, based on the plurality of detection values output from the detector, the calculated spatial coordinates having a first coordinate, a second coordinate, and a third coordinate corresponding to the first axis, the second axis, and the third axis, respectively; and a coordinate corrector configured to correct a value of the first coordinate or a value of the second coordinate based on a value of the third coordinate.

10. A position detection method for detecting a position of an object approaching or in contact with an operation surface, the method comprising:
detecting a degree of contact or proximity of the object at a plurality of detection positions of the operation surface, and outputting a plurality of detection values representing the degree at the plurality of detection positions;

calculating spatial coordinates of the object in a spatial coordinate system having a first axis and a second axis parallel to the operation surface and a third axis perpendicular to the operation surface, based on the plurality of detection values, the calculated spatial coordinates having a first coordinate, a second coordinate, and a third coordinate corresponding to the first axis, the second axis, and the third axis, respectively; and correcting a value of the first coordinate or a value of the second coordinate based on a value of the third coordinate.

* * * * *